United States Patent [19]
Tsuchiya

[11] 3,942,557
[45] Mar. 9, 1976

[54] VEHICLE SPEED DETECTING SENSOR FOR ANTI-LOCK BRAKE CONTROL SYSTEM

[75] Inventor: Kiichi Tsuchiya, Tokyo, Japan

[73] Assignee: Isuzu Motors Limited, Japan

[22] Filed: May 31, 1974

[21] Appl. No.: 475,184

[30] Foreign Application Priority Data
June 6, 1973   Japan.................................. 48-63516

[52] U.S. Cl. ............... 137/810; 73/521; 303/21 CF
[51] Int. Cl.² ......................... B60T 8/06; F15C 1/16
[58] Field of Search ........... 137/804, 805, 808, 809, 137/810, 811, 812, 813, 815, 818, 819, 829; 73/515, 521–525; 303/21 F, 21 CF, 21 CG

[56] References Cited
UNITED STATES PATENTS

| | | | |
|---|---|---|---|
| 3,342,196 | 9/1967 | Plzybylko | 137/804 X |
| 3,369,845 | 2/1968 | Leonard | 303/21 F |
| 3,444,874 | 5/1969 | Sparks | 73/521 X |
| 3,473,389 | 10/1969 | Howland | 137/808 X |
| 3,532,081 | 10/1970 | Eastman | 137/805 X |
| 3,651,824 | 3/1972 | Ishida | 73/521 X |
| 3,804,471 | 4/1974 | Fish | 137/804 X |

Primary Examiner—William R. Cline
Attorney, Agent, or Firm—McGlew and Tuttle

[57] ABSTRACT

The sensor comprises an operational circuit consisting of fluidic elements. The detecting sensor causes variation in the pressure of a control fluid supplied to the operational circuit. The variation of pressure, depending on the rotational speed of vehicle wheels, serves to detect the vehicle speed from the pressure in the control fluid.

4 Claims, 5 Drawing Figures

VEHICLE SPEED DETECTING SENSOR FOR ANTI-LOCK BRAKE CONTROL SYSTEM

BACKGROUND OF THE INVENTION:

A number of anti-lock brake control systems have been developed for use for vehicle wheels, and are intended to prevent sudden locking of vehicle wheels during application of a brake to the vehicle wheels. Such sudden locking of the vehicle wheels may be avoided by detection of the rotational speed of a vehicle propeller shaft and the variation in the ratio of rotational speed to time. In the application of a brake, the value of pressure as varied is used for a control signal for controlling an actuator provided in the brake operating fluid system.

An anti-lock brake control system of the kind as above described mostly includes electronic circuits which serve to detect the variation of rotational speed and compare the value of varied pressure with a desired value. The system including electronic circuits practically involves many disadvantages such as complexity of circuitry, high cost and expense of its operation and maintenance.

An anti-lock brake control system using fluidic elements has been lately proposed in place of the electronic circuit, which is featured in that a sensor is provided in the control system which can vary pressure in a control fluid supplied to an operational circuit depending on the rotational speed and the vehicle speed. These sensors have been used practically but they have still many disadvantages in that, in most cases, the construction is very complicated and their performance is not excellent.

SUMMARY OF THE INVENTION:

Therefore, a primary object of the invention is to provide a sensor particularly adapted for detecting the variation in the pressure of a control fluid supplied to an operational circuit of an anti-lock brake control system, the detection of variation of the fluid pressure being effected depending on the rotating speed or angular velocity of vehicle wheels.

Another object of the invention is to provide a sensor as above described, which can be manufactured with extreme simplicity and low cost.

The sensor according to the invention essentially comprises a casing including a vortex chamber, an inlet port for a feed fluid opening to and arranged tangentially to the vortex chamber, an outlet port for the fluid opening into the vortex chamber, and arranged on the axis of the vortex chamber, and an port opening into the vortex chamber, and a rotor rotatably mounted in the vortex chamber within the casing.

BRIEF DESCRIPTION OF THE DRAWING

Other objects and features of the invention will now be illustrated in detail only by way of example with reference to the accompanying drawings in which.

DESCRIPTION OF PREFERRED EMBODIMENT

Figure 1:
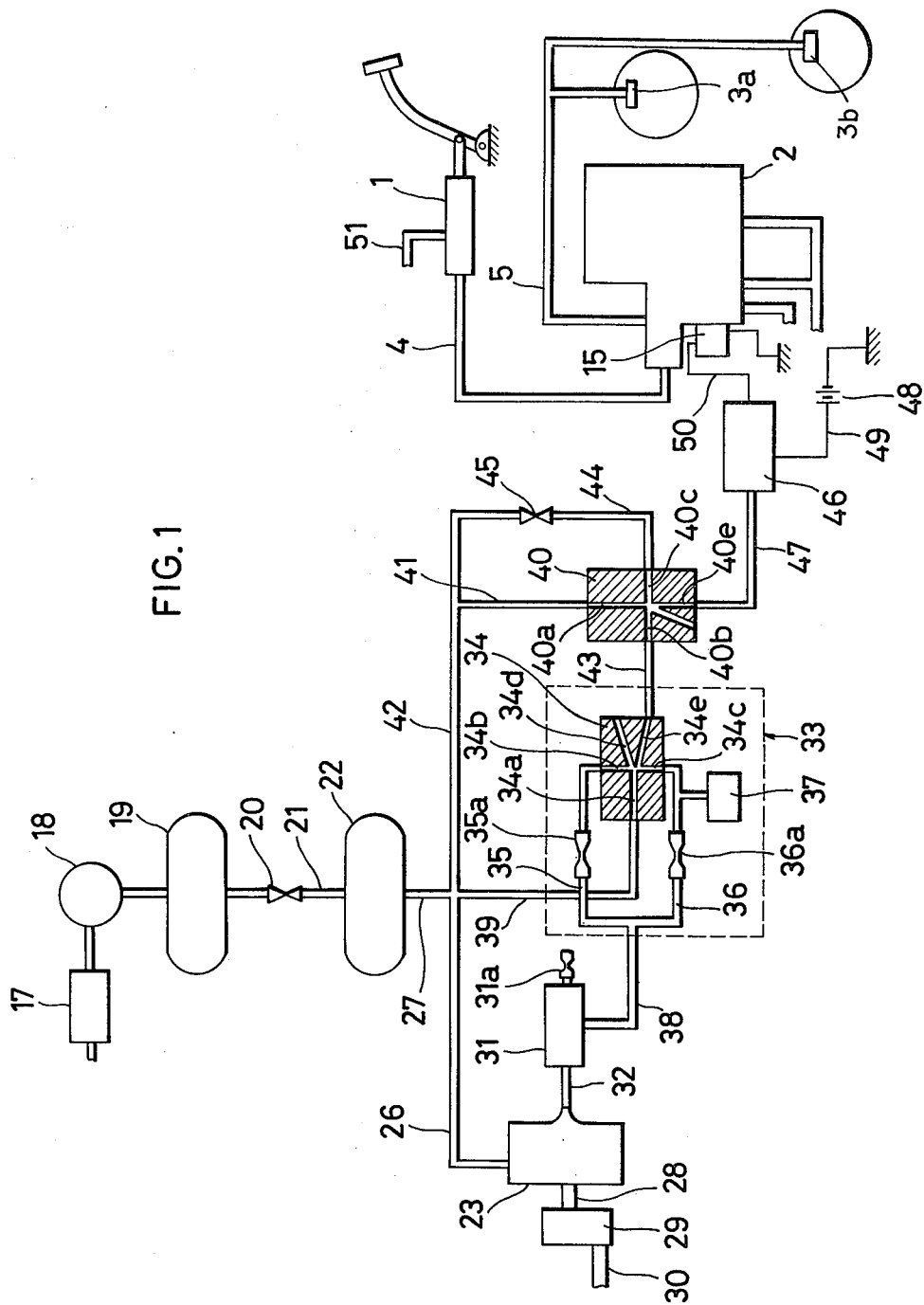
FIG. 1 is a schematic diagram of an embodiment of a brake anti-lock system with a wheel speed detecting sensor according to the invention.

An anti-lock system with a wheel speed detecting sensor incorporating the present invention is shown in FIG. 1. In the figure, numeral 1 designates a brake master cylinder and 2 an actuator. The actuator 2 is arranged between hydraulic pressure pipes 4 and 5 connecting the master cylinder 1 and wheel cylinders 3a and 3b of wheel brakes.

Figure 4:
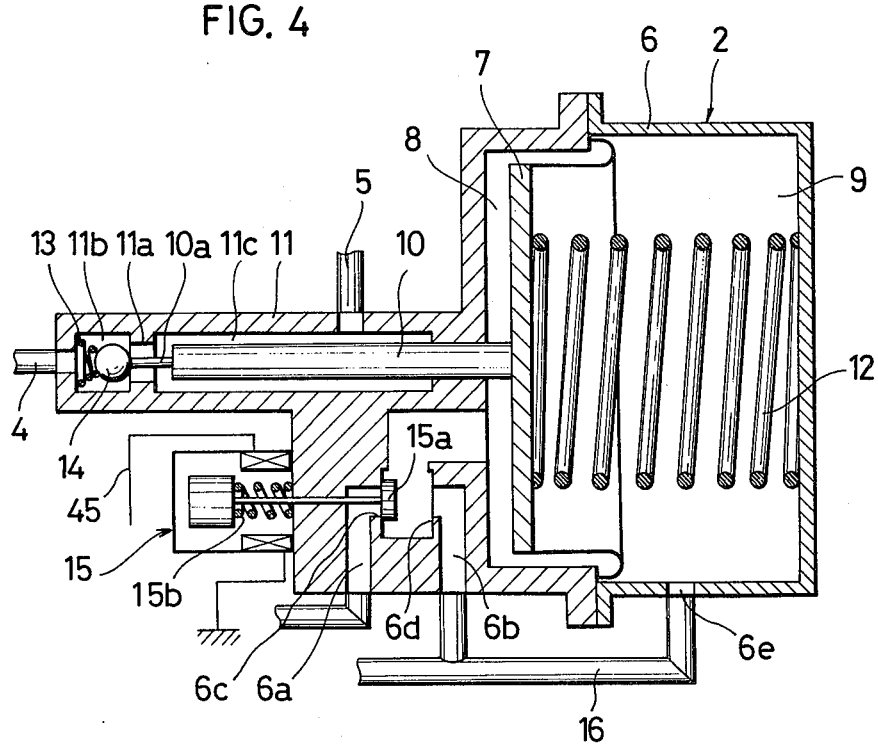
FIG. 4 is an axial cross section of an actuator.

As shown in FIG. 4, actuator 2 has a body 6 partitioned into two chambers 8 and 9 by a diaphragm 7. An operating piston 10 has, at an end, one operating projection 10a and is slidably arranged in a cylinder 11 formed integrally with the actuator body 6, the other end of the operating piston being secured to the diaphragm 7 as above described. The operating piston 10 is normally displaced to the left as the diaphragm 7 is pushed leftward, as viewed in the figure, by the biasing force of a return spring 12. The projection 10a at the one end of the operating piston 10 further pushes a ball valve 14 leftward, as viewed in the figure, against the force of a spring 13, causing the ball valve 14 to be removed from a valve seat 11a therein interconnecting the chambers 11b and 11c of the cylinder 11.

In the actuator body 6, there is provided an air passage 6a and a vacuum passage 6b both communicating with the chamber 8 and opposite to these passages there is located a valve 15a actuated by an electromagnetic means 15. Normally, as shown in FIG. 4, the valve 15a may seat in the valve seat 6c interrupting the communication between the chamber 8 and the air passage 6a, the chamber 8 being connected through the vacuum passage 6b and piping 16 to a vacuum source of an intake manifold of an engine (not shown).

Also, the chamber 9 of the actuator body 6 is connected at all times to the vacuum source through a passage bore 6e and the piping 16.

There are shown, in FIG. 1, an air cleaner 17, a compressor 18, an air tank 19, a pressure reducing valve 20 provided in an air pipe 21 which is connected to the air tank 19, and an air tank 22 connected to the air pipe 21.

The wheel speed detecting sensor 23 according to the invention will now be described in detail with reference to FIGS. 2 and 3.

Figure 2:
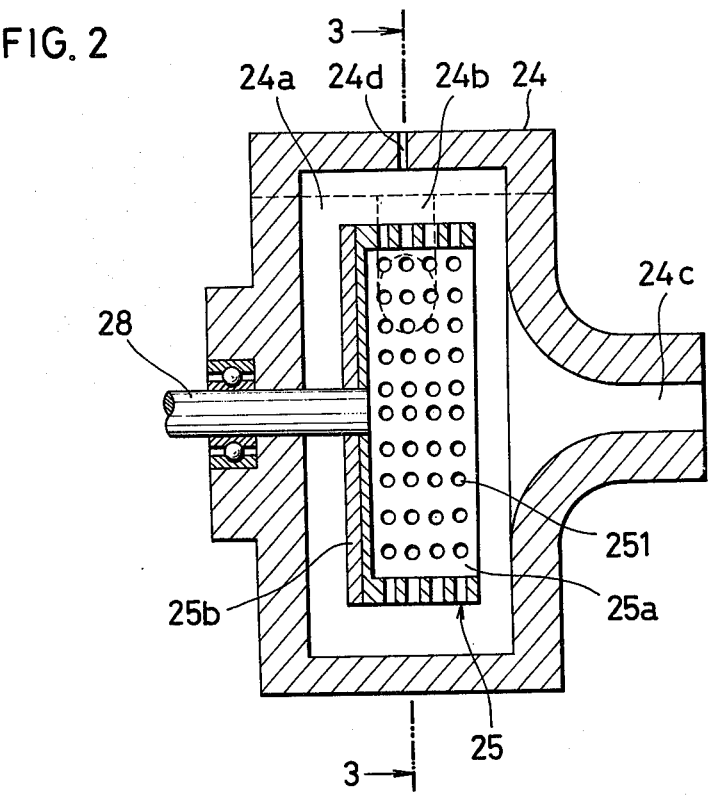
FIG. 2 is an axial cross section of an embodiment of the wheel speed detecting sensor according to the invention.
Figure 3:
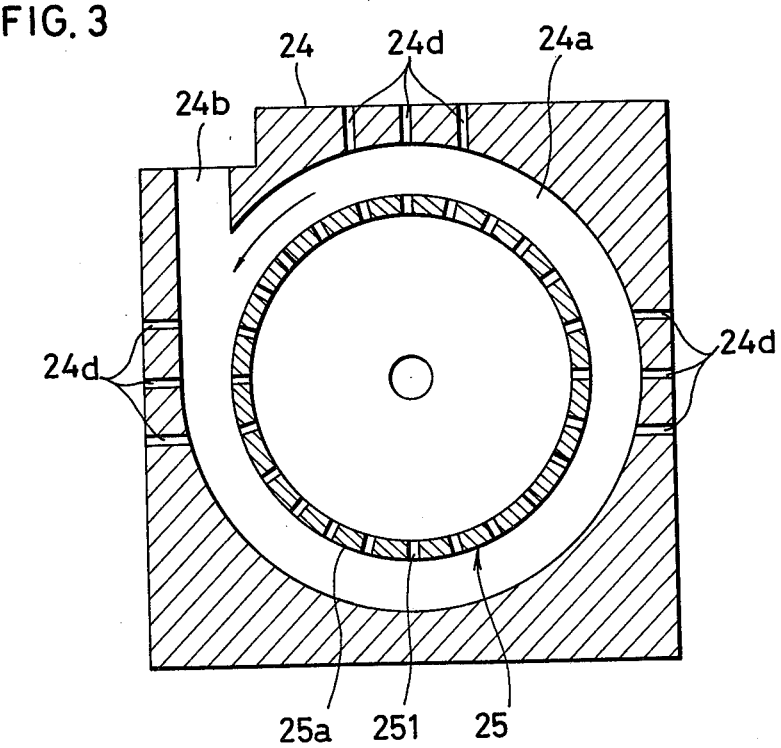
FIG. 3 is a cross sectional view taken along the line 3—3 of FIG. 2.

The wheel speed detecting sensor 23, shown in FIGS. 2 and 3, essentially consists of a casing 24 and a rotor 25 provided in the casing 24. The casing 24 includes a vortex chamber 24a, a fluid inlet port 24b opening into and directed tangentially to the vortex chamber 4, a fluid outlet port 24c opening into the vortex chamber 24a and provided on a center axis of the vortex chamber 24a, and an exhaust port 24d for a fluid opening to the vortex chamber 24a, the fluid inlet port 24b being connected by air pipe 26 to air pipe 27 connected to the air tank 22.

The cup-shape rotor 25 includes a cylindrical wall 25a having therein a number of perforations 25l and a circular side plate 25b, and is mounted on a shaft 28 for rotation in the vortex chamber 24a in the casing 24.

The rotary shaft 28 is connected through a gear train 29 and a flexible shaft 30 to a driving means, such as a propeller shaft or the main shaft of a transmission which has not been shown. Thus, the angular velocity of flexibile shaft 30 is increased by gear train 29 and then transmitted to rotary shaft 28.

An adjusting tank is shown at 31 and is provided at a throttling exhaust port 31a and connected by air pipe 32 to fluid outlet 24c arranged in the casing 24 of the wheel speed detecting sensor 23.

A differential circuit 33, used as a fluidic element, includes a proportional amplifier element 34 having flow paths 34a, 34b, 34c, 34d, and 34e, an air pipe 35 connected to the path 34b and having a throttle 35a midway between the air pipe 35 and the path 34b, an air pipe 36 connected to the path 34c and having a throttle 36a midway between the air pipe 36 and the path 34c, and a volume tank 37 connected to the air pipe 36.

The air pipes 35 and 36 of the differential circuit 33 arranged as described are connected through the air pipe 38 to the adjusting tank 31. Also, the path 34a of the proportional amplifier element 34 is connected to the air pipe 27 through the air pipe 39.

A Schmidt trigger circuit 40 contains fluidic elements and is provided with paths 40a, 40b, 40c, 40d, and 40e. The path 40b is connected to the path 34e of the proportional amplifier element 34 through the air pipe 43.

The path 40a of the Schmidt trigger circuit 40 is connected through the air pipe 41 and air pipe 42 to the above-mentioned air pipe 27. The path 40c is connected to the air pipe 27 through an air pipe 44 and air pipe 42.

Between the air pipe 44 and air pipe 42, there is provided a pressure reducing valve 45, which adjusts the air pressure to a predetermined value acting upon the path 40c as a bias pressure. A transducer 46 is connected to the path 40e of the Schmidt trigger circuit 40 through the air pipe 47 and further connected to electric potential source 48 through a conductor 49. This transducer 46 receives a trigger pressure signal from the path 40e, which trigger pressure signal is converted into an electric signal when it passes through the air pipe 47, causing a current to flow through a conductor 50 to the electromagnetic means 15, of actuator 2, which is in turn actuated.

In the construction according to the invention as above described, the system can operate as described below.

The master cylinder 1 is first put into operation. Hydraulic pressure generated in the master cylinder is effective through the hydraulic pressure pipe 4, cylinder chambers 11b and 11c of the actuator 2, and then through the hydraulic pressure pipe 5. The pressure acts on the wheel cylinders 3a and 3b of the rear wheels and also acts on the wheel cylinders of front wheels (not shown) through the hydraulic pressure pipe 51 so as to actuate the front and rear wheel brakes. Compressed air, supplied to the air tank 19 from the compressor 18, has its pressure reduced to a value as low as 0.5 Kg/cm$^2$ by the pressure reducing valve 20 and is stored in the air tank 22 after passing through the air pipe 21.

The compressed air in the air tank 22 flows through the air pipe 27 to the air pipes 26, 39, and 42. Air flowing the air pipe 26 passes to the vortex chamber 24a from the fluid inlet port 24b provided in the casing 24 of the wheel speed detecting sensor 23 and flows out through the fluid outlet port 24c, with a portion being discharged into atmosphere through exhaust ports 24d.

The rotor 25 arranged in the vortex chamber 24a is driven in the direction of the arrow in FIG. 3, during running of a vehicle through the flexible shaft 30, gear train 29, and rotary shaft 28, so that the pressure of air flowing through fluid outlet port 24c will vary with the speed of rotation of the rotor 25.

Thus, the higher the speed of rotation the greater is the volume of air flowing through exhaust ports 24d and accordingly the lesser is the pressure of air flowing from the fluid outlet 24c. Reversely, when the speed of rotation of the rotor 25 is low, the pressure of the air flowing from the fluid outlet port 24c is relatively high.

Thus the speed of rotation of the driving system, i.e., variation in the speed of rotation of the wheels, can be translated into variation of the air pressure.

One example of experiments made for proving the above effect of the system will be described below.

In the experiment, the following conditions are provided conforming to the requirement of all components and parts of the wheel speed detecting sensor employed for this experiment.

| | |
|---|---|
| Diameter of vortex chamber 24a of casing 24 | 40 mm |
| Width of vortex chamber 24a of casing 24 | 18 mm |
| Diameter of fluid inlet port 24b | 5 mm |
| Diameter of exhaust port 24d | 0.5 mm |
| Diameter of cylinder 25a of rotor 25 | 32 mm |
| Width of cylinder 25a | 11 mm |
| Diameter of openings 251 in cylinder 25a | 1 mm |
| Number of openings 251 in cylinder 25a | 144 |

The wheel speed detecting sensor consists of members fully conforming to the above requirements. It was assumed that the pressure of air flowing into the fluid inlet port 24b is 0.5 Kg/cm$^2$ and the value of resistance in the throttle exhaust port 31a in the adjusting tank 31 is 0.508 gs/cm$^5$, and thus variation of pressure on the outlet side of the air pipe 38 of the adjust tank 31, induced from variation of the rotational speed of the rotor 25, was measured. It was found that, as shown in FIG. 5, the variation of the pressure was linear in form and a direct translation of variation in the speed to the variation of air pressure was obtained.

Figure 5:
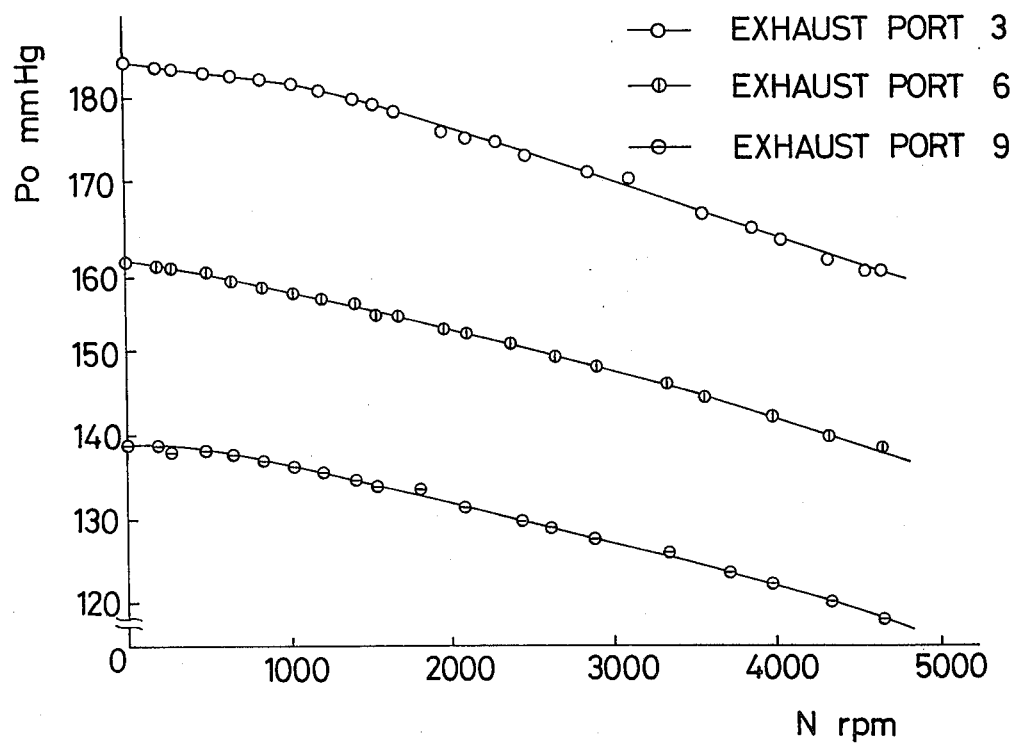
FIG. 5 is a chart representing a relationship between rotational speed of a rotor for the wheel speed detecting sensor of the invention and air pressure at an outlet port of a fluid.

The result of experiments using the sets of exhaust ports 24d of the sensor in the number of 3, 6 and 9, respectively, are shown in FIG. 5.

The wheel speed is thus translated by the wheel speed detecting sensor 23 into air pressure responsive to the speed of the wheels. Accordingly, the air flowing out from the adjusting tank 31 flows through the air pipe 38 to the air pipe 35 and air pipe 36 of the differential circuit 33, as an air pressure signal corresponding to the speed of rotation of the wheels or of the driving system.

The air flowing into the air pipe 35 and the air pipe 36 flows into the paths 34b and 34c of the proportional amplifier element 34, as the output pressure signal of the primary delay circuit including the throttle 35a, throttle 36a and volume tank 37.

The air flowing into the path 34b and the path 34c acts as the control fluid for the air flowing into the path 34a of the proportional amplifier element 34 through the air pipe 39. The pressure of the air in path 34e is thus representative of the output air pressure of differential component 34 relative to the time the air pressure flows through path 34e from the wheel speed detecting sensor 23.

The air flowing into the path 34e flows through the air pipe 43, as the output signal of the differential circuit 33, into the path 40b of the Schmidt trigger circuit 40, acting as the input signal of the Schmidt trigger circuit 40.

In the Schmidt trigger circuit 40, air which has been adjusted to a predetermined pressure by the pressure reducing valve 45 flows into the path 40c through the air pipe 44, so as to act as the bypass pressure.

Consequently, when the air pressure of the input signal in the path 40b is higher than the bias pressure in the path 40c, the air flowing into the path 40a through the air pipe 41 flows into the path 40e in the form of the trigger pressure signal.

When the air pressure in the path 40b is lower than the bypass pressure in the path 40c, the air flowing into the path 40a is discharged to atmosphere through the path 40d and therefore the output of the path 40e becomes zero.

The trigger pressure signal flowing from the path 40e enters through the air pipe 47 into the transducer 46 where the trigger pressure signal is converted into an electrical signal. This electric signal is supplied to the conductor 50 and causes a current to flow in the electromagnetic means 15 of the actuator 2, the electromagnetic means being then actuated. Since the electromagnetic means 15 is actuated, the valve 15a is moved to the right against the force of the return spring 15b as can be seen in FIG. 4. The valve 15a is released from the valve seat 6c and seats on the valve seat 6d. In consequence, the connection of chamber 7 of the actuator 2 to the vacuum source is interrupted but chamber 8 is then connected to atmosphere through the path 6a.

The chamber 9 of the actuator 2 is at all times connected to the vacuum source through the port 6e and piping 16 so that the diaphragm 7 is forcibly moved to the right as viewed in FIG. 4, against the force of the return spring 12.

Accordingly, the operating piston 10 connected at an end to the diaphragm 7 also moves to the right and thus the ball valve 14 is pushed to the right by the spring 13 to seat in the valve seat 11a so as to interrupt the connection between the hydraulic pressure pipe 4 and the hydraulic pressure pipe 5.

By movement of the piston 10 to the right, the cylinder 11 is increased in volume and thus pressure in the hydraulic pressure pipe 5 connected to the wheel cylinders 3a and 3b is reduced thereby decreasing the braking force and preventing locking of wheels.

When the air pressure of the input signal introduced to the path 40b of the Schmidt trigger circuit 40 decreases to a value less than the bias pressure acting on the path 40c, the air flowing into the path 40a is discharged at atmosphere through the path 40d.

Therefore, no trigger pressure signal is generated in the path 40e of the Schmidt trigger circuit 40. The transducer 46 stops its operation interrupting the electric signal to the electromagnetic means 15.

Valve 15a of electromagnetic means 15 is thus moved to the left, as viewed in FIG. 4, by return spring 15b, so that the valve can interrupt the connection of chamber 8 to atmosphere by seating on valve seat 6c and connecting chamber 8 to the vacuum source through path 6b and pipe 16.

With both chambers 8 and 9 under same pressure, the diaphragm 7 is displaced to the left by the force of the return spring 12, resulting in the operating piston 10 being moved to the left causing the ball valve 14 to be pushed to the left against the force of the spring 13 by means of the operating projection 10a, consequently interconnecting the chamber 11b and 11c.

When the chambers 11b and 11c are in communication with each other, the hydraulic pressure generated in the master cylinder 1 is caused to act upon the wheel cylinders 3a and 3b passing through the hydraulic pressure pipe 4, chambers 11b and 11c of the actuator 2 and hydraulic pressure pipe 5. By movement of the operating piston 10 to the left, the volume of the cylinder 11 decreases and accordingly the pressure in the hydraulic pressure system connected to the wheel cylinders 3a and 3b increases so as to increase the braking force of the vehicle.

This operation can be repeated successively for the prevention of locking of the vehicle wheels permitting free braking operation during running of the vehicle.

While a specific embodiment of the invention has been shown and described in detail to illustrate the application of the principles of the invention, it will be understood that the invention may be embodied otherwise without departing from such principles.

What is claimed:

1. A vehicle speed detecting sensor, for an anti-lock hydraulic brake control system including a master cylinder, wheel brake cylinders and hydraulic lines interconnecting the master cylinder and the wheel brake cylinders, said sensor comprising, in combination, a casing defining a cylindrical vortex chamber having a circumferential wall interconnecting axially spaced end walls; a rotor rotatably mounted in said vortex chamber on one end wall of said casing and having a cylindrical peripheral wall facing and spaced radially from said circumferential wall; a transmission connecting said rotor to the driving system of the vehicle for rotation at an angular velocity proportional to the vehicle speed; a pressure fluid inlet opening tangentially of said vortex chamber through said circumferential wall and in the direction of rotation of said rotor; a pressure fluid outlet opening axially of said vortex chamber through the other end wall of said casing; exhaust port means opening through said circumferential wall; a source of fluid under pressure connected to said pressure fluid inlet; and an operational circuit, including fluid elements, connected to said pressure fluid outlet and in flow-controlling relation with said hydraulic lines interconnecting said master cylinder to said wheel brake cylinders; whereby the fluid pressure at said pressure fluid outlet is proportional to the angular velocity of said rotor and thus to the vehicle speed.

2. A vehicle speed detecting sensor, as claimed in claim 1, in which said rotor is cup-shape including an imperforate wall closing one end of said cylindrical peripheral wall; said cylindrical peripheral wall being formed with perforations therethrough.

3. A vehicle speed detecting sensor, as claimed in claim 1, in which said exhaust port means comprises sets of plural exhaust ports opening to atmosphere through said circumferential wall of said casing.

4. A vehicle speed detecting sensor, as claimed in claim 1, including an actuator controlling fluid flow through said hydraulic lines; said actuator including a electromagnetically actuated valve controlling flow of fluid from said master cylinder to said wheel brake cylinders; said operational circuit including a transducer connected between a source of electric potential and said electromagnetically actuated valve and operable, responsive to a pressure signal, to control the connection of said electromagnetically operated valve to said source of electric potential.

* * * * *